US006970878B1

(12) United States Patent
Butcher (10) Patent No.: US 6,970,878 B1
(45) Date of Patent: Nov. 29, 2005

(54) RANGE OPTIMIZATION ALGORITHMS

(75) Inventor: Kristin Butcher, Deerfield Beach, FL (US)

(73) Assignee: Siemens Communications, Inc., Boca Raton, FL (US)

( * ) Notice: Subject to any disclaimer, the term of this patent is extended or adjusted under 35 U.S.C. 154(b) by 0 days.

(21) Appl. No.: 09/489,324

(22) Filed: Jan. 21, 2000

(51) Int. Cl.[7] ............................................. G06F 17/00
(52) U.S. Cl. .................. 707/102; 707/101; 707/103 R; 707/104.1
(58) Field of Search .............. 370/397–409; 707/1–10, 707/100–104.1, 200–206; 709/1–5

(56) References Cited

U.S. PATENT DOCUMENTS

| | | | | |
|---|---|---|---|---|
| 5,546,390 A | * | 8/1996 | Stone ........................... | 370/60 |
| 5,678,043 A | * | 10/1997 | Ng et al. ..................... | 707/101 |
| 6,026,398 A | * | 2/2000 | Brown et al. ................. | 707/5 |
| 6,104,701 A | * | 8/2000 | Avargues et al. ............ | 709/239 |
| 6,151,631 A | * | 11/2000 | Ansell et al. ................ | 709/229 |
| 6,195,658 B1 | * | 2/2001 | Comito et al. ................ | 707/6 |
| 6,219,821 B1 | * | 4/2001 | Hagerman et al. ...... | 707/103 R |

* cited by examiner

*Primary Examiner*—Jean M. Corrielus
*Assistant Examiner*—Isaac M. Woo (57) ABSTRACT

Disclosed is a method for representing a given range of numbers with a plurality of entries. It is determined whether one or more portions of the given range are representable as one or more entries that utilize wildcards. If there are portions that are representable as entries having wildcards, such portions of the given range are then represented as one or more entries that utilize wildcards. All numbers of any remaining portions of the given range that are not representable as one or more entries that utilize wildcards are represented as entries that do not utilize wildcards. The entries are optimized such that a minimum number of entries are used to represent the given range.

20 Claims, 8 Drawing Sheets

| Given Range | Optimized Set |
|---|---|
| 4788 - 5593 | 4788, 4789, 479X, 48XX, 49XX, 50XX, 51XX, 52XX, 53XX, 54XX, 550X, 551X 552X, 553X, 554X, 555X, 556X, 557X, 558X, 5590, 5591, 5592, 5593 |
| 800 - 2999 | 8XX, 9XX, 1XXX, 2XXX |

Figure 1A

| Given Range | Sub-Range 1 | Sub-Range 2 | Sub-Range 3 | Sub-Range 4 |
|---|---|---|---|---|
| 4318-5689 | 4318-4319 | 4320-4999 | 5000-5679 | 5680-5689 |
| 560-2346 | N/A | 560-1999 | 2000-2339 | 2340-2346 |
| 4300-4399 | N/A | N/A | 4300-4389 | 4390-4399 |
| 4476-7688 | 4476-4479 | 4480-6999 | 7000-7679 | 7680-7688 |

RANGE OPTIMIZATION ALGORITHMS

BACKGROUND OF THE INVENTION

The present invention relates generally to database management systems. More specifically, the present invention relates to methods and apparatus for representing a range of numbers within a database or any suitable memory structure.

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Another example of a database record or field is a number, such as a telephone number or router address within a network telephony application. Telephone service providers typically store millions of phone numbers for its customers. Additionally, several numbers may be stored for a single customer. Each router within a network also typically stores millions of router address numbers within a router table. The router utilizes the router table to determine how to route incoming data to other routers.

Networks (e.g., data and/or telephony networks) are rapidly expanding. Thus, the size of databases utilized by a router or service provider, for example, is also correspondingly increasing. Unfortunately, relatively large databases are difficult to manage. For example, access speeds decrease as size increases. Of course, larger databases also consume larger amounts of memory.

In view of the foregoing, there is a need for an improved mechanism for representing numbers within a database so that database size utilization is optimized.

SUMMARY OF THE INVENTION

Accordingly, the present invention provides an apparatus and method for representing a plurality of numbers with a subset of numbers utilizing wildcards. In general terms, a given range of numbers is represented by a subset of number entries within a database by maximizing the use of wildcard characters, such as "X". For example, the given range 400–599 can be represented by the two entries 4XX and 5XX. By way of another example, the given range 399–599 is represented with the three entries 399, 4XX, and 5XX. In other words, the given range of numbers is represented by a minimum set of entries appended with one or more wildcards and/or entries that are not appended with wildcards.

Conventionally, if a range of numbers were all associated with the same piece of information (e.g., the same customer), each number is represented within the database as a separate entry. That is, each number is separately associated with the particular piece of information. For example, the database contains the following entries:

555–0000: customer A

.

.

.

555–0009: customer A

The present invention provides mechanisms for representing a given range of number within a minimum set of wildcard entries. For example, the above entries can be reduced to a single entry, 555–000X: customer A.

Thus, the present invention advantageously provides mechanisms for optimally representing a range of numbers within a database, or any other suitable memory structure. Database size and memory usage for a given range of numbers may thereby be significantly reduced as compared with conventional mechanisms that do not utilize wildcards to represent a range of numbers.

In one embodiment, a method for representing a given range of numbers with a plurality of entries is disclosed. It is determined whether one or more portions of the given range are representable as one or more entries that utilize wildcards. If there are portions that are representable as entries having wildcards, such portions of the given range are then represented as one or more entries that utilize wildcards. All numbers of any remaining portions of the given range that are not representable as one or more entries that utilize wildcards are represented as entries that do not utilize wildcards. The entries are optimized such that a minimum number of entries are used to represent the given range.

In another method embodiment, the given range is divided into a first sub-range, a second sub-range, a third sub-range, and a fourth sub-range. The numbers within the first sub-range have lower values than the second sub-range; the numbers within the second sub-range have lower values than the third sub-range; etc. The numbers within the first sub-range are included as entries within the optimized set. The second, third, and fourth sub-ranges are optimized into a plurality of entries using wildcards, and the entries are included within the optimized set.

In another aspect, the invention pertains to computer readable medium having programming instructions for representing a given range of numbers with a plurality of entries. The computer readable medium includes computer code for performing either of the above described methods. In other aspects, the invention pertains to a router or computer system for representing a given range of numbers with a plurality of entries. The router or computer system includes a memory and a processor coupled to the memory. At least one of the memory and the processor are adapted to provide either of the above described methods.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In general terms, the present invention provides mechanisms for producing an optimized set of database entries for a given range of numbers. Each optimized set maximizes the use of wildcard characters (e.g., "X"). That is, the number of entries within each optimal set is minimized. The optimized set may include one or more wildcard type entries that utilize wildcards. When a digit of an entry is in the form of a wildcard, the entry represents a plurality of numbers, wherein the wildcard is replaced with the values 0 through 9. For example, the entry 9X represents numbers 90 through 99.

Figure 1A:
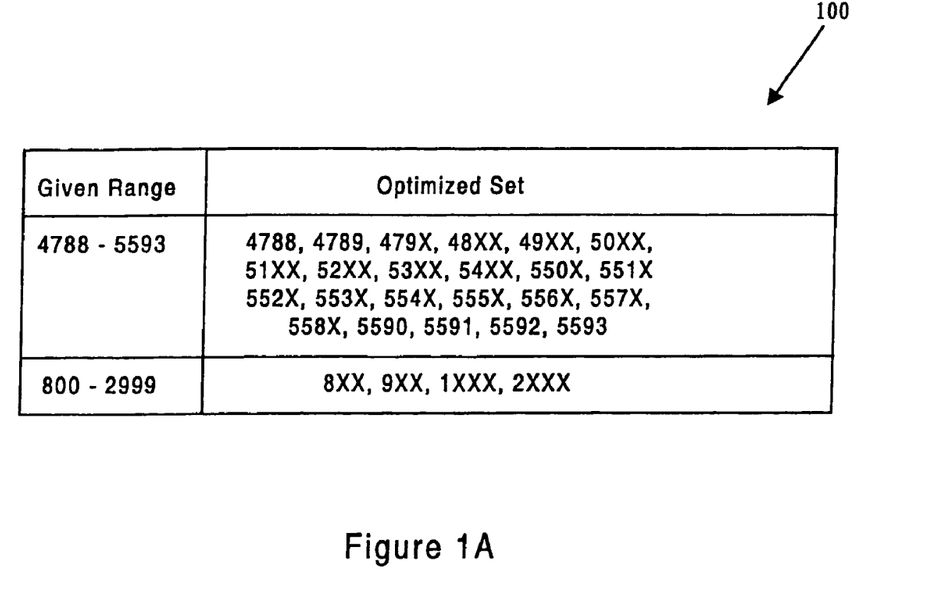
FIG. 1A is a table representing two examples of optimized sets for two different given ranges in accordance with one embodiment of the present invention.

FIG. 1A is a table 100 representing two examples of optimized sets for two different given ranges in accordance with one embodiment of the present invention. The first given range is 4788–5593 is reduced to a first optimized set, and the second given range is 800–2999 is reduced to a second optimized set. Some optimized sets contain only wildcard type entries. In the illustrated embodiment, the second optimized set includes the entries 8XX, 9XX, 1XXX, and 2XXX. Other optimized sets, on the other hand, contain a mixture of wildcard entries and non-wildcard entries. As shown, the first optimized set includes the entries 4788, 4789, 479X, 48XX, 49XX, 50XX, 51XX, 52XX, 53XX, 54XX, 550X, 551X, 552X, 553X, 554X, 555X, 556X, 557X, 558X, 5590, 5591, 5592, and 5593.

The first optimized set includes the entries 4788 and 4789, which do not include a wildcard character. This is because the first given range does not include the numbers 4780 through 4787. Hence, the entry 478X cannot be used to represent a portion of the first given range. Likewise, entries 5590, 5591, 5592, and 5593 do not have a wildcard character. In contrast, the first optimized set does include the entry 479X since the first given range includes the numbers 4790 through 4799. Similarly, an entry may include more than one wildcard character. In the illustrated embodiment, the entry 48XX is utilized to represent numbers 4800 through 4899, which numbers are included within the first given range.

Figure 2:
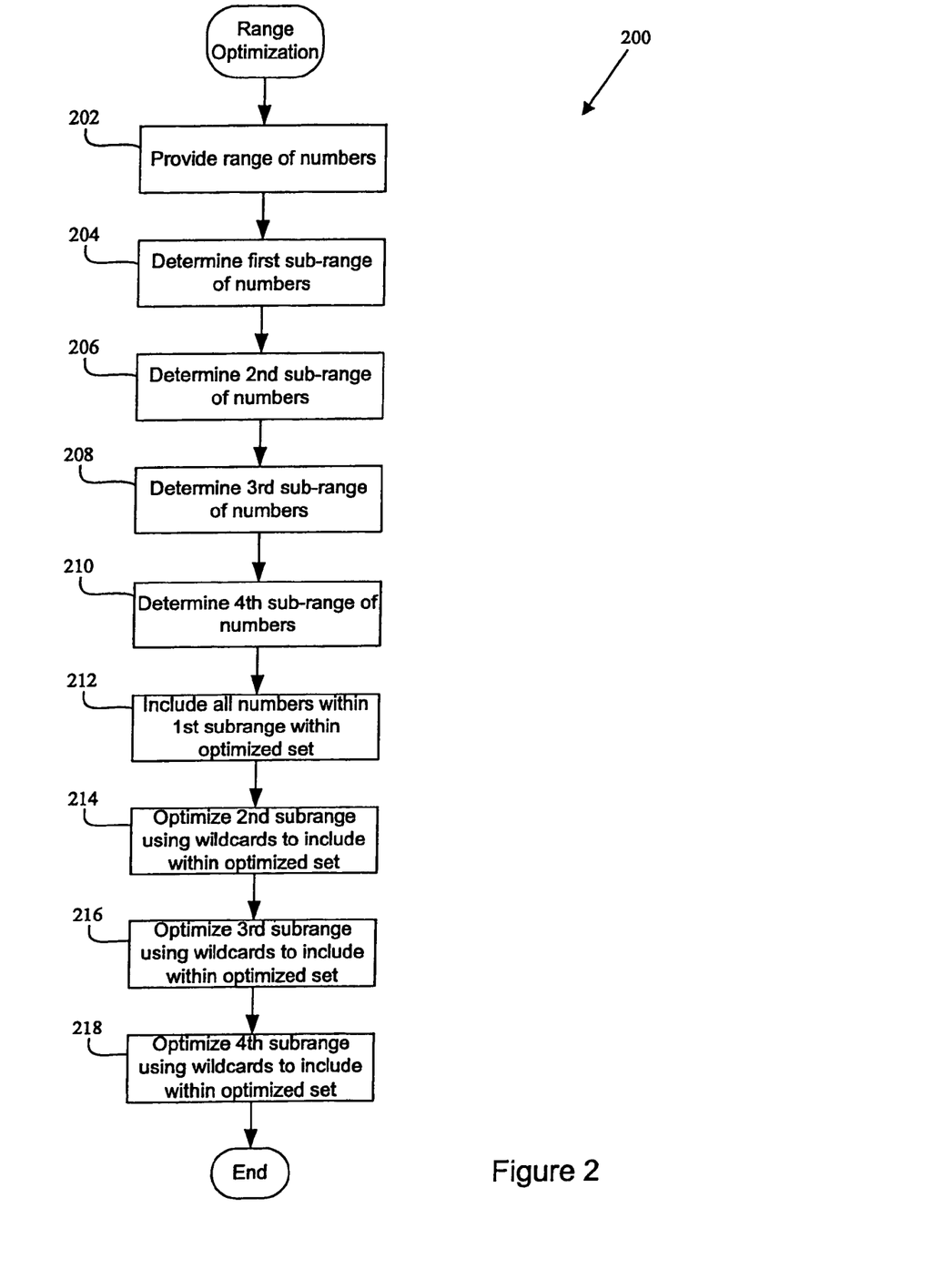
FIG. 2 is a flowchart illustrating a range optimization process in accordance with one embodiment of the present invention.

In general terms, the present invention provides mechanisms for producing an optimized set from a given range. FIG. 2 is a flowchart illustrating a range optimization process 200 in accordance with one embodiment of the present invention. Initially, a given range of numbers are provided in operation 202. The given range is divided into one or more sub-ranges. In the illustrated embodiment, the given range is divided into four sub-ranges. However, one or more of these sub-ranges may be empty (e.g., not contain any numbers).

Figure 1B:
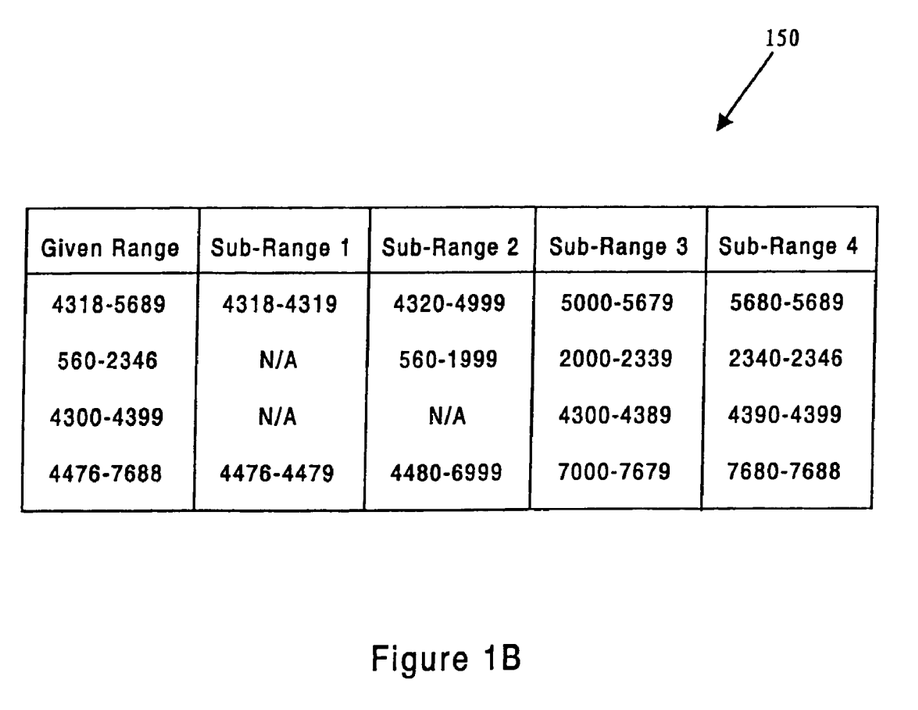
FIG. 1B is a table listing four given ranges and their associated four sub-ranges in accordance with one embodiment of the present invention.

As shown, a first sub-range of numbers is then determined in operation 204. In general terms, the first sub-range includes numbers at the beginning portion of the given range that cannot be represented by one or more wildcard type entries. Thus, the first sub-range includes the values from the given beginning of the entire range to, but not including, the first number divisible by ten found in the range. FIG. 1B is a table 150 listing of four given ranges and their four associated sub-ranges in accordance with one embodiment of the present invention. As shown in FIG. 1B, the first sub-range for the given range of 4318–5689 is defined as 4318–4319. Likewise, the first sub-range for the given range 4476–7688 determined to be equal to 4476–4479.

If the beginning value of the entire range is divisible by ten, then there will be no first sub-range. As shown in FIG. 1B, there is no first sub-range for the given range 560–2346 since the first number 560 is divisible by 10. Likewise, the first sub-range for the given range 4300–4399 is empty.

Referring back to FIG. 2, a second sub-range of numbers for the given range is then determined in operation 206. The second sub-range includes the values from one more than the ending digit of the first sub-range (or the beginning value of the entire range if there is no first sub-range) to one less than the most significant power of ten of the ending range. For example, the second sub-range for the given range of 4318–5689 is defined as 4320–4999. The beginning number 4320 of the second sub-range follows the ending number of the first sub-range 4318–4319. The ending number 4999 of the second sub-range precedes 5000, which is the number within the given range that may be represented as an integer value times a highest power of ten ($5 \times 10^3$).

The second sub-range may also be empty when the first number is also the number that may be represented by an integer times a highest power of ten. As shown in FIG. 1B, there is an empty second sub-range for the given range of 4300–4399 since 4300 is the number that can be represented with an integer value times a highest power of ten (43 times $10^2$).

A third sub-range of numbers is then determined in operation 208. The third sub-range includes all the numbers from one more than the ending value of the second sub-range (or the beginning number of the given range if the second sub-range is empty) to the last number which is divisible by ten of the entire range. In the above example (i.e., given range of 4318–5689), the third sub-range is determined to be 5000–5679. Of course, the third sub-range may also be empty.

A fourth sub-range of numbers is then determined in operation 210. The fourth sub-range includes the remaining values from one more than the ending value of the third sub-range (or the beginning number of the given range if the third sub-range is empty) to the last value of the entire range. For the given range of 4318–5689, the fourth sub-range is 5680–5689.

After the four sub-ranges are determined for a given range, each sub-range is then optimized to determine which entries to include within an optimized set. The entries within the optimized set represent the given range of numbers. One or more wildcard entries and/or non-wildcard entries are determined for each sub-range of numbers.

All numbers within the first sub-range are simply included within the optimized set in operation 212. In other words, the numbers within the first sub-range cannot be represented with wildcard entries. For the first sub-range 4318–4319, entries 4318 and 4319 are included within the optimized set. The second sub-range is then optimized in operation 214. In general terms, a set of wildcard entries are used to represent the second sub-range, and the wildcard entries are added to the optimized set. Likewise, the third sub-range is also optimized using wildcard entries that are also included within the optimized set in operation 216. The fourth sub-range is optimized utilizing either wildcard entries or non-wildcard entries in operation 218. The range optimization process 200 then ends.

Figure 3A:
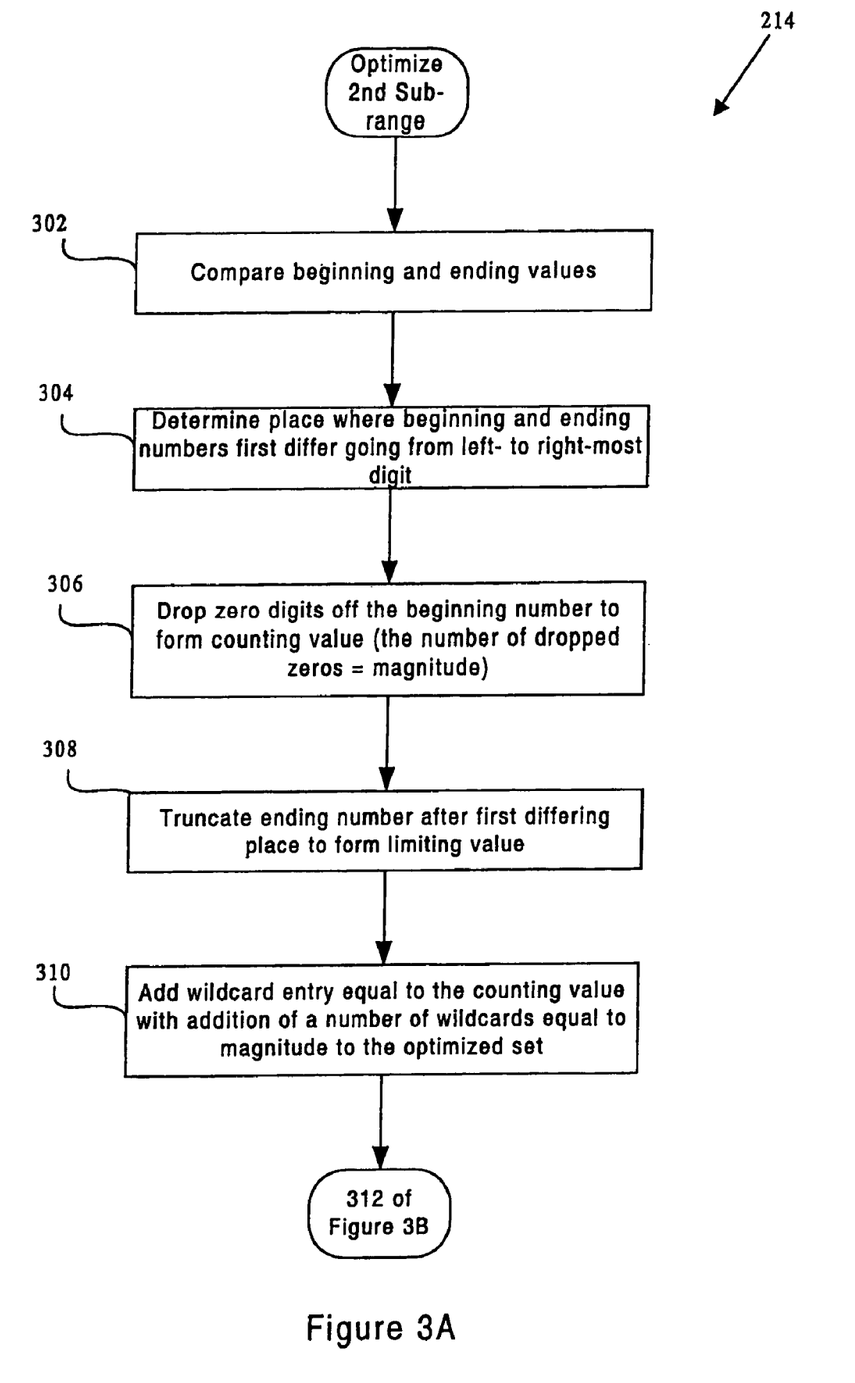
FIGS. 3A and 3B illustrate a flowchart for optimizing a second sub-range in accordance with one embodiment of the present invention.
Figure 3B:
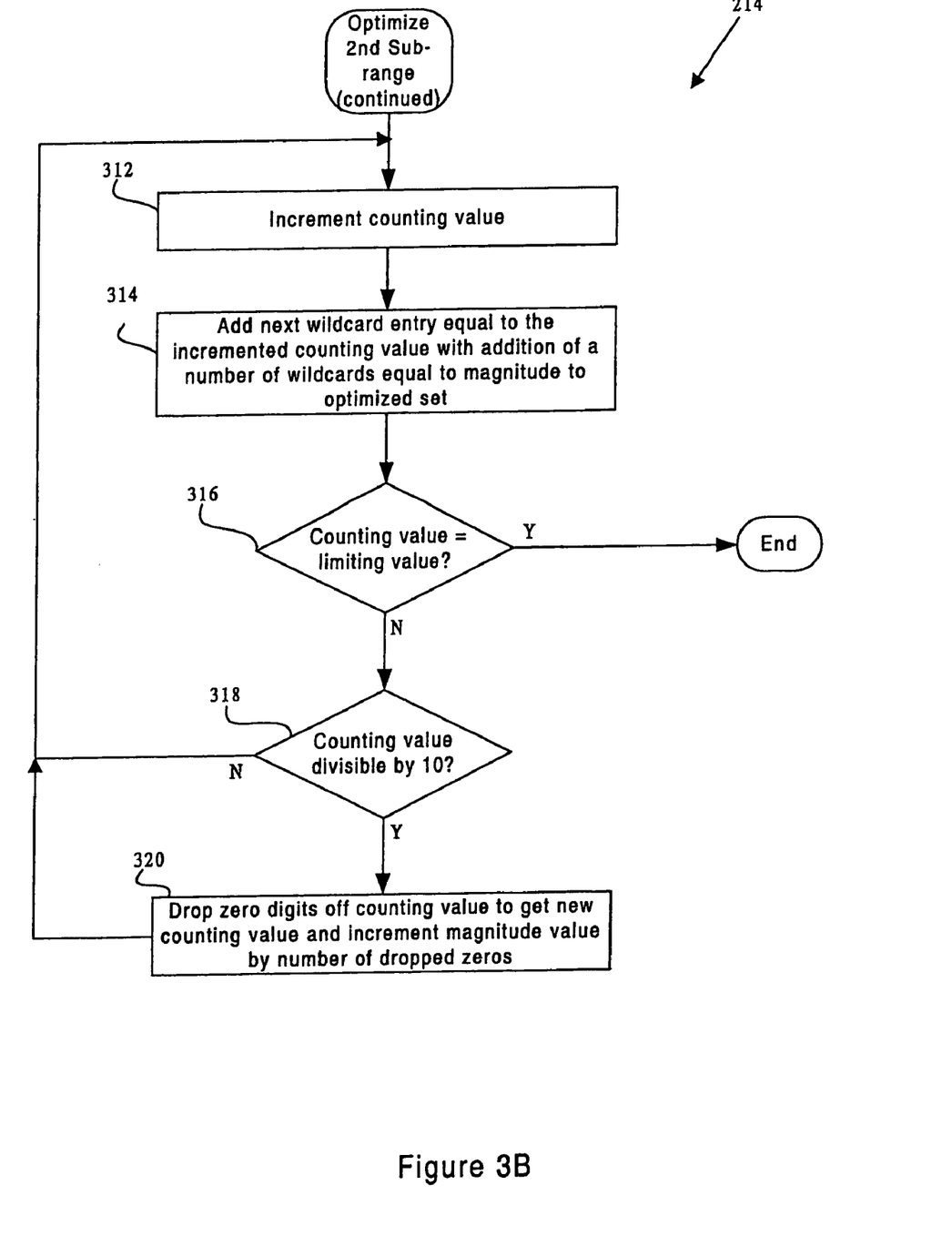

FIGS. 3A and 3B illustrate a flowchart 214 for optimizing the second sub-range in accordance with one embodiment of the present invention. Initially, the beginning and end values of the second sub-range are compared in operation 302. A place is then determined where the beginning and ending numbers first differ going from the left- to right-most digits in operation 304. This place is the limiting value as to how much this sub-range can be optimized. For example, if the second sub-range is 4,320–4,999, the second place is the first digit to differ from left to right. That is, the second place digit for the beginning number 4320 is 3, and the second place for the ending number 4999 is 9. The first place is a "4" for both ending and beginning numbers.

Zero digits are then dropped off the beginning number to form a counting value and the number of dropped zeros are defined as a magnitude value in operation 306. The number of dropped zeros (i.e., the magnitude value) signifies the number of wildcards which will be used in place of the zeros. After dropping the zeros, the value obtained according to our previous example is 432. In this case, the magnitude value is 1 since a single zero is dropped.

The ending number (e.g., 4,999) is then truncated after the first differing place to form a limiting value in operation 308. According to the example range, the limiting value is 49. A wildcard entry equal to the counting value (e.g., 432) with addition of a number of wildcards equal to the magnitude (e.g., 1) is added to the optimized set in operation 310. The first wildcard entry for the example range is 432X.

Referring to FIG. 3B, the counting value is then incremented in operation 312. In our example, the counting value is now equal to 433. A next wildcard entry equal to the incremented counting value (e.g., 433) with addition of a number of wildcards equal to the magnitude value (e.g., 1) is then added to the optimized set in operation 314. Thus, the second wildcard entry for the example range is 433X.

It is then determined whether the counting value (e.g. 433) is equal to the limiting value (e.g., 49). If the counting value is not yet equal to the limiting value, it is then determined whether the counting value is divisible by 10 in operation 318. Operations 312 and 314 are repeated until the counting value is divisible by 10 (or the counting value equals the limiting value). In our example, the next wildcard entries are 434X, 435X, 436X, 437X, 438X, and 439X.

When the counting value is divisible by 10 (e.g., when the counting value is 440), zero digits are dropped of the counting value to get a new counting value and the magnitude value is incremented by the number of dropped zeros in operation 320. In our example, the new counting value is 44 and the new magnitude value is 2. Operations 312 through 314 are again repeated for the new counting and magnitude values until either the counting value equals the limiting value or the counting value is divisible by 10. In other words, the counting value is incremented, and entries equal to the incremented counting value with addition of a number of wildcards equal to the magnitude value are added to the optimized set. In our example, the entries 44XX, 45XX, 46XX, 47XX, 48XX, and 49XX are added to the optimized set.

After the entry 49XX is added to the optimized set, the counting value now equals the limiting value (e.g., 49). When the counting value equals the limiting value in operation 316, optimization of the second sub-range ends. In other words, the ending number within the second sub-range has been included within the optimized set. In our example, the ending number is 4999, which is included within the last entry 49XX of the optimized set.

Figure 4:
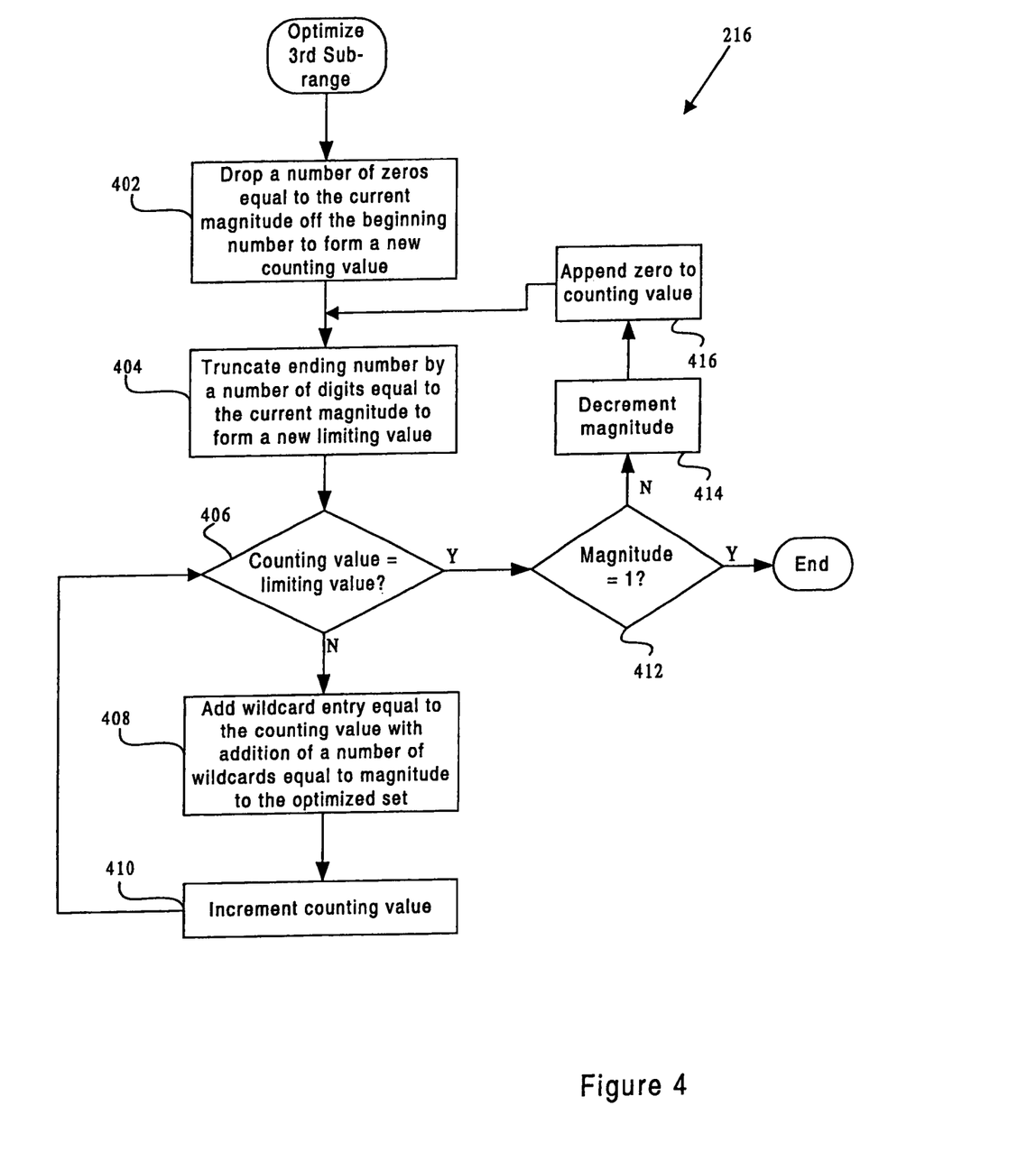
FIG. 4 is a flowchart illustrating a process of optimizing a third sub-range in accordance with one embodiment of the present invention.

FIG. 4 is a flowchart illustrating a process 216 of optimizing the third sub-range in accordance with one embodiment of the present invention. In our example, the third sub-range is 5000–5679. Initially, a number of zeros equal to the current magnitude (e.g., 2) are dropped off the beginning number to form a new counting value in operation 402. In our example, the new counting value is 50. The third sub-range's ending number (e.g., 5679) is then truncated by a number of digits equal to the current magnitude to form a new limiting value in operation 404. In the above example, the new limiting value is equal to 56.

It is then determined whether the counting value is equal to the limiting value in operation 406. If it is not equal, a next wildcard entry equal to the counting value with addition of a number of wildcard equal to the magnitude is added to the optimized set in operation 408. In our example, the next wildcard entry is 50XX. The counting value is then incremented (e.g., to 51) in operation 410. Operations 408 and 410 are repeated until the counting value reaches the limiting value in operation 406. The next entries are 51XX, 52XX, 53XX, 54XX, and 55XX. After the entry 55XX is added to the optimized set, the counting value is incremented to 56 (which equals the limiting value) in operation 410.

When the counting value is equal to the limiting value, it is then determined whether the magnitude value is equal to one in operation 412. In our example, the magnitude value is 2. If the magnitude is not equal to one, the magnitude is then decremented (e.g., to 1) in operation 414. A zero is also appended to the counting value in operation 416. In our example, the counting value is now 560. A new limiting value is formed by truncating the ending number (e.g., 5679) of the third sub-range by a number of digits equal to the current magnitude value (e.g., 1). The new limiting value is now 567.

It is again determined whether the counting value equals the limiting value in operation 406. Entries are added to the optimized set and the counting value is incremented until the counting value equals the limiting value. Each entry equals the current counting value with the addition of a number of wildcards equal to the current magnitude value. In our example, the next entries are 560X, 561X, 562X, 563X, 564X, 566X, and 567X. After the entry 567X is added to the optimized set, the counting value (567) now equals the limiting value (567). Thus, it is determined whether the magnitude value equals 1 in operation 412. In our example, this is true. Optimization of the third sub-range then ends.

Figure 5:
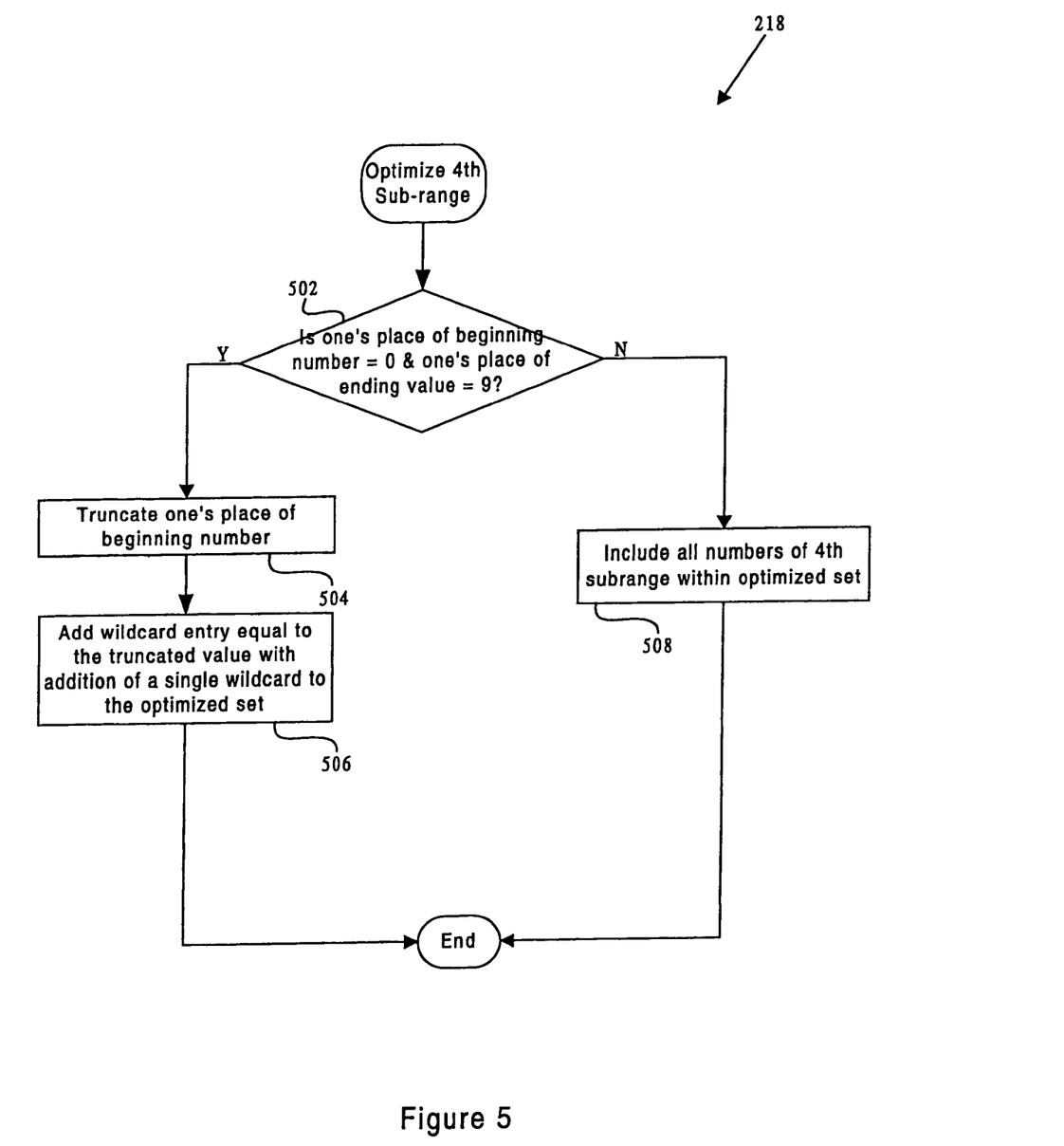
FIG. 5 is a flowchart illustrating the process for optimizing a fourth sub-range in accordance with one embodiment of the present invention.

FIG. 5 is a flowchart illustrating the process 218 for optimizing the fourth sub-range in accordance with one embodiment of the present invention. Initially, it is determined whether the ones place of the beginning number is equal to zero and the ones place of the ending value is equal to nine in operation 502. If this is not true, all the numbers within the fourth sub-range are included within the optimized set in operation 508. If this is true, the ones place of the beginning number is truncated in operation 504. The last wildcard entry is then set equal to the truncated value with the addition of a single wildcard in operation 506. The optimization process 200 is then completed.

The above described optimization procedures may be applied to any suitable application that utilizes ranges of numbers. For example, each number may represent a telephone number or a router address. When the range of numbers are all associated with the same piece of information, an optimized set of numbers utilizing wildcards may be associated with the same piece of information within a database. By way of example, a range of telephone numbers may be associated with the same customer, same geographic region, or any other suitable information. Thus, the optimization procedures may be utilized to associate an optimized set of numbers with the same information thereby reducing the number of entries within the database.

Figure 6A:
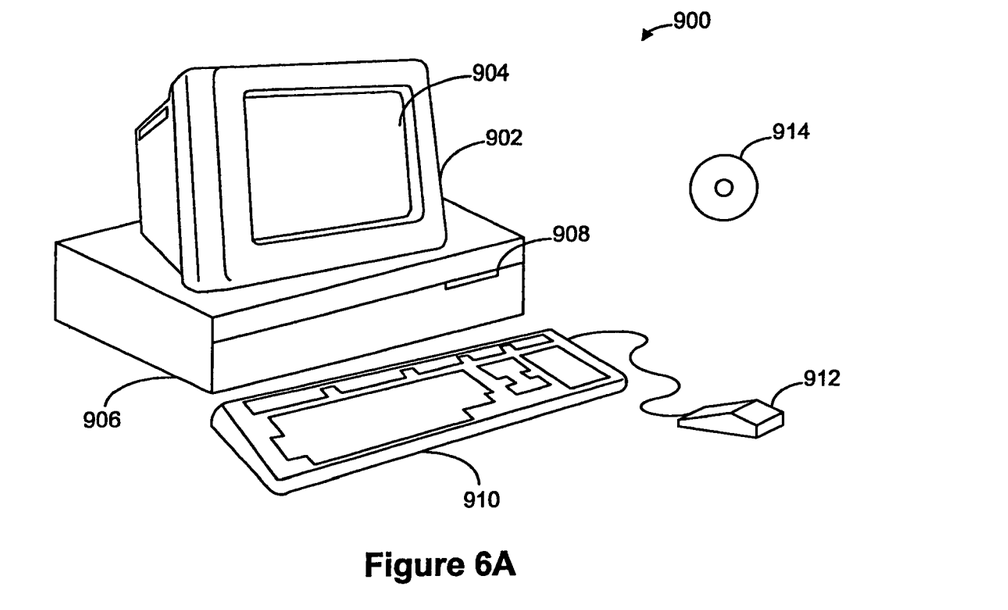
FIGS. 6A and 6B illustrate a computer system suitable for implementing embodiments of the present invention.
Figure 6B:
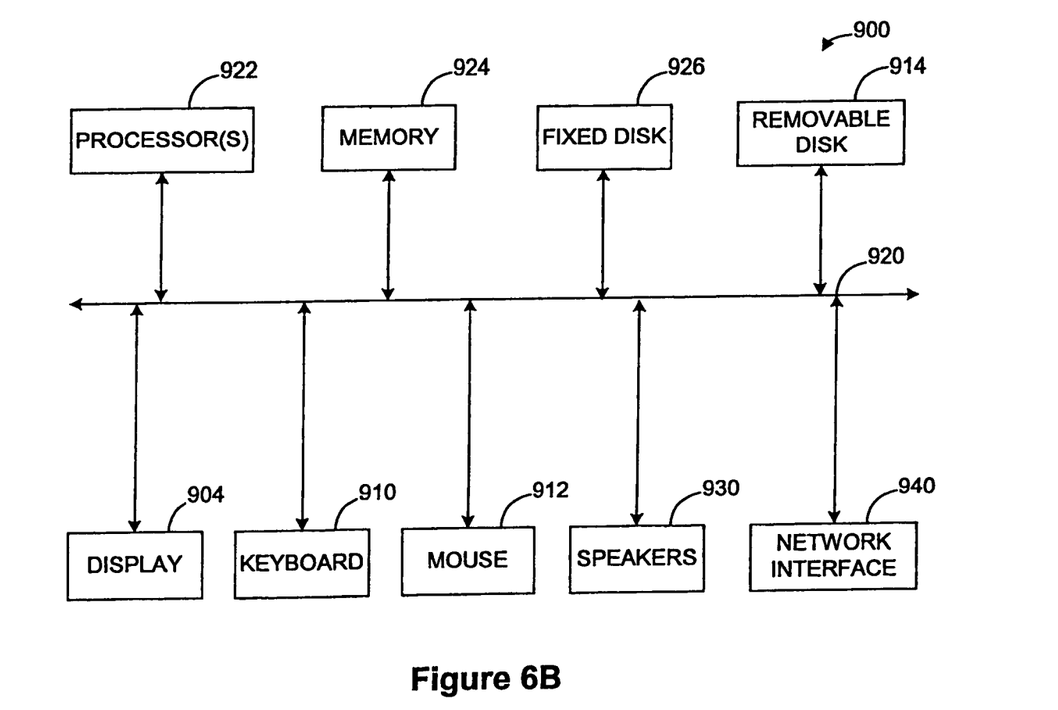

FIGS. 6A and 6B illustrate a computer system 900 suitable for implementing embodiments of the present invention. FIG. 6A shows one possible physical form of the computer system. Of course, the computer system may have many physical forms ranging from an integrated circuit, a printed circuit board and a small handheld device up to a huge super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 6B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. For example, the RAM may be utilized to store the optimized set and associated information within the form of a database. By way of illustration, the given range of phone numbers 555–1000 through 555–2999 may be associated with the same customer A. After the given range is optimized, the given range of numbers is reduced to two database entries: 555–1XXX: customer A and 555–2XXX: customer A.

Both RAM and ROM types of memories may include any suitable form of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. The invention may also be embodied in a carrier wave travelling over an appropriate medium such as airwaves, optical lines, electric lines, etc. Examples of computer code include machine code, such as produced by a compiler, and files containing higher level code that are executed by a computer using an interpreter.

Generally, the optimization technique of the present invention may be implemented in software and/or hardware. For example, it can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid range optimization system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. A general architecture for some of these machines will appear from the description given below. In an alternative embodiment, the optimization mechanisms system may be implemented on a general-purpose network host machine such as a personal computer or workstation. Further, the invention may be at least partially implemented on a card (e.g., an interface card) for a network device or a general-purpose computing device.

Figure 7:
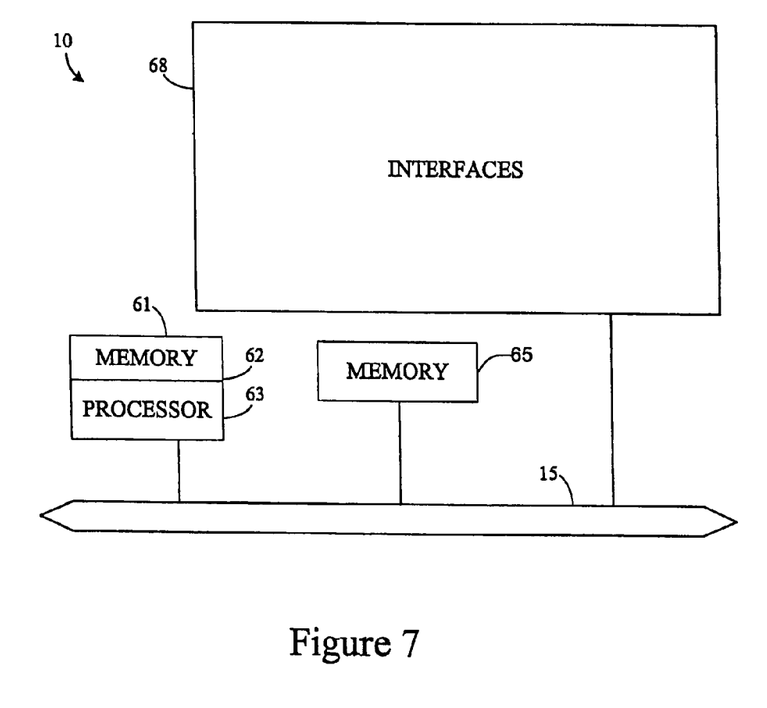
FIG. 7 illustrates a router suitable for implementing embodiments of the present invention.

Referring now to FIG. 7, a router 10 suitable for implementing the present invention includes a master central processing unit (CPU) 62, interfaces 68, and a bus 15 (e.g., a PCI bus). When acting under the control of appropriate software or firmware, the CPU 62 is responsible for such router tasks as routing table computations and network management. It may also be responsible for dividing a given range into a plurality of sub-ranges, optimizing each sub-range to determine entries for a database or router table, etc. It preferably accomplishes all these functions under the control of software including an operating system and any appropriate applications software. CPU 62 may include one or more processors 63 such as a processor from the Motorola family of microprocessors or the MIPS family of microprocessors. In an alternative embodiment, processor 63 is specially designed hardware for controlling the operations of router 10. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The programming instructions may be configured to store optimized data entries within memory block 61, which entries are associated with relevant pieces of information. Within the context of a telephony application, a range of telephone numbers may be represented as one or more wildcard numbers and associated with a particular customer, service type, geographical region, etc. Searches may then be efficiently performed to find all numbers associated with a particular piece of information. Each number within the given range and its associated information does not have to be found; instead, each entry within an optimized set is found.

Likewise, a range of router addresses may be represented as one or more wildcard numbers that are associated with a particular destination address. For example, from the perspective of a particular router, a plurality of routers may all be capable of forwarding a particular data packet to its intended destination. These routers may be represented by an optimized set of entries that are each associated with the intended destination. A router may then look up which router addresses are associated with a particular destination address by searching through a minimum set of entries that are associated with the particular address.

The interfaces 68 are typically provided as interface cards (sometimes referred to as "line cards"). Generally, they control the sending and receiving of data packets over the network and sometimes support other peripherals used with the router 10. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 7 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (such as, for example, memory block 65) configured to store data, program instructions for the general-purpose network operations and/or range optimization described herein. The program instructions may control the operation of an operating system and/or one or more applications, for example. The memory or memories may also be configured to store the four sub-range's beginning and ending numbers, the optimized set of entries, the database itself, etc.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. For example, the optimization of each sub-range may occur in any suitable order (e.g., the fourth sub-range is optimized before the first sub-range). Accordingly, the present embodiments are to be considered as illustrative and not restrictive, and the invention is not to be limited to the details given herein, but may be modified within the scope and equivalents of the appended claims.

What is claimed is:

1. A method for representing a range of numbers by an optimized set of hierarchically ordered sub-ranges using wildcard entries, the range having a lowest value range number and a highest value range number, wherein each of the sub-ranges includes a lowest value sub-range number and a highest value sub-range number, the method comprising:
   (a) generating a set of sub-ranges from the range; and
   (b) optimizing at least one of the sub-ranges, said optimizing (b) including at least:
   (c) determining a difference position between a lowest value sub-range number and a highest value sub-range number indicating a maximal degree of optimization of the sub-range;
   (d) optimizing the sub-range based upon the difference position;
   (e) determining a counting value and a magnitude value wherein the magnitude value indicates a number of wildcards used to optimize the sub-range;
   (f) truncating the highest value sub-range number based upon the difference position to form a limiting value;
   (g) adding a wildcard entry to the optimized set based upon the counting value and the magnitude value;
   (h) incrementing the counting value; and
   (i) repeating (g) and (h) until the counting value equals the limiting value or the counting value is divisible by ten.

2. A method as recited in claim 1, wherein the determining (c) comprises:
   comparing the lowest value sub-range number and the highest value sub-range number from a most significant digit position to a least significant digit position of each, wherein the difference position is a first position where the comparing is different.

3. A method as recited in claim 2, further comprising:
   for the lowest value sub-range number, determining a number of contiguous zero digits from the least significant digit position;
   dropping off the number of contiguous zero digits from the lowest value sub-range number to form the counting value; and
   setting the magnitude value as the number of dropped contiguous zero digits.

4. A method as recited in claim 1, wherein when the counting value is divisible by ten then, forming a new counting value by dropping zero digits off of the counting value starting at a least significant digit position; and incrementing the magnitude value by the number of dropped zero digits.

5. A method as recited in claim 1, wherein when the counting value is equal to the limiting value, then the optimizing (d) ends for the sub-range.

6. A method as recited in claim 1, wherein for a second sub-range, a second sub-range lowest value number is one more than a first sub-range highest value number.

7. A method as recited in claim 6 wherein the first sub-range is formed of the range of numbers starting at the lowest value range number up to but not including a first range number divisible by ten.

8. A method as recited in claim 7, wherein when the lowest range number is divisible by an $n^{th}$ power of ten, the first $n^{th}$ sub-ranges each have zero entries.

9. A method as recited in claim 1, wherein each of the range of numbers represents a telephone number.

10. A method as recited in claim 1, wherein each of the range of numbers represents a router address.

11. A computing system for representing a range of numbers by an optimized set of hierarchically ordered sub-ranges using wildcard entries, the range having a lowest value range number and a highest value range number, wherein each of the sub-ranges includes a lowest value sub-range number and a highest value sub-range number, comprising:

a memory; and a processor coupled to the memory arranged to execute programming code for (a) generating a set of sub-ranges from the range; and (b) optimizing at least one of the sub-ranges, said optimizing (b) including at least:

(c) determining a difference position between a lowest value sub-range number and a highest value sub-range number indicating a maximal degree of optimization of the sub-range;

(d) optimizing the sub-range based upon the difference position;

(e) determining a counting value and a magnitude value wherein the magnitude value indicates a number of wildcards used to optimize the sub-range;

(f) truncating the highest value sub-range number based upon the difference position to form a limiting value;

(g) adding a wildcard entry to the optimized set based upon the counting value and the magnitude value;

(h) incrementing the counting value; and (i) repeating (g) and (h) until the counting value equals the limiting value or the counting value is divisible by ten.

12. A computing system as recited in claim 11, wherein the determining (c) comprises:

comparing the lowest value sub-range number and the highest value sub-range number from a most significant digit position to a least significant digit position of each, wherein the difference position is a first position where the comparing is different.

13. A computing system as recited in claim 12, further comprising:

for the lowest value sub-range number, determining a number of contiguous zero digits from the least significant digit position;

dropping off the number of contiguous zero digits from the lowest value sub-range number to form the counting value; and setting the magnitude value as the number of dropped contiguous zero digits.

14. A computing system as recited in claim 11, wherein when the counting value is divisible by ten then, forming a new counting value by dropping zero digits off of the counting value starting at a least significant digit position; and incrementing the magnitude value by the number of dropped zero digits, wherein when the counting value is equal to the limiting value, then the optimizing (d) ends for the sub-range.

15. A computer program product for representing a range of numbers by an optimized set of hierarchically ordered sub-ranges using wildcard entries, the range having a lowest value range number and a highest value range number, wherein each of the sub-ranges includes a lowest value sub-range number and a highest value sub-range number, comprising:

computer code for generating a set of sub-ranges from the range;

computer code for optimizing at least one of the sub-ranges, said optimizing code including at least:

computer code for determining a difference position between a lowest value sub-range number and a highest value sub-range number indicating a maximal degree of optimization of the sub-range;

computer code for optimizing the sub-range based upon the difference position;

computer code for optimizing further includes at least, computer code for determining a counting value and a magnitude value wherein the magnitude value indicates a number of wildcards used to optimize the sub-range;

computer code for truncating the highest value sub-range number based upon the difference position to form a limiting value;

computer code for adding a wildcard entry to the optimized set based upon the counting value and the magnitude value;

computer code for incrementing the counting value; and computer code for repeating adding the wildcard entry and the incrementing the counting value until the counting value equals the limiting value or the counting value is divisible by ten; and computer readable medium for storing the computer code.

16. A computer program product as recited in claim 15, wherein the code for determining a difference position comprises:

computer code for comparing the lowest value sub-range number and the highest value sub-range number from a most significant digit position to a least significant digit position of each, wherein the difference position is a first position where the comparing is different.

17. A computer program product as recited in claim 15, further comprising:

for the lowest value sub-range number, computer code for determining a number of contiguous zero digits from the least significant digit position;

computer code for dropping off the number of contiguous zero digits from the lowest value sub-range number to form the counting value; and computer code for setting the magnitude value as the number of dropped contiguous zero digits.

18. A computer program product as recited in claim 17, wherein when the counting value is divisible by ten then the set of programming instructions further includes:

computer code for forming a new counting value by dropping zero digits off of the counting value starting at a least significant digit position; and computer code for incrementing the magnitude value by the number of dropped zero digits, wherein when the counting value is equal to the limiting value, then the optimizing (d) ends for the sub-range.

19. A router for representing a range of numbers by an optimized set of hierarchically ordered sub-ranges using wildcard entries, the range having a lowest value range number and a highest value range number, wherein each of the sub-ranges includes a lowest value sub-range number and a highest value sub-range number, comprising:

a memory; and a processor coupled to the memory arranged to execute the computer program product as recited in claim 15.

20. A apparatus for representing a range of numbers by an optimized set of hierarchically ordered sub-ranges using wildcard entries, the range having a lowest value range number and a highest value range number, wherein each of the sub-ranges includes a lowest value sub-range number and a highest value sub-range number, the method comprising:

means for generating a set of sub-ranges from the range;

means for optimizing at least one of the sub-ranges, said optimizing means including at least, means for determining a difference position between a lowest value sub-range number and a highest value sub-range number indicating a maximal degree of optimization of the sub-range;

means for optimizing the sub-range based upon the difference position(c) determining a difference position between a lowest value sub-range number and a highest value sub-range number indicating a maximal degree of optimization of the sub-range;

means for optimizing the sub-range based upon the difference position;

means for determining a counting value and a magnitude value wherein the magnitude value indicates a number of wildcards used to optimize the sub-range;

means for truncating the highest value sub-range number based upon the difference position to form a limiting value;

means for adding a wildcard entry to the optimized set based upon the counting value and the magnitude value;

means for incrementing the counting value; and means for repeating adding the wildcard entry and the incrementing the counting value until the counting value equals the limiting value or the counting value is divisible by ten.

* * * * *